Dec. 7, 1937. G. H. BABB 2,101,126
ADVERTISING CINEMATOGRAPH
Filed Nov. 17, 1936
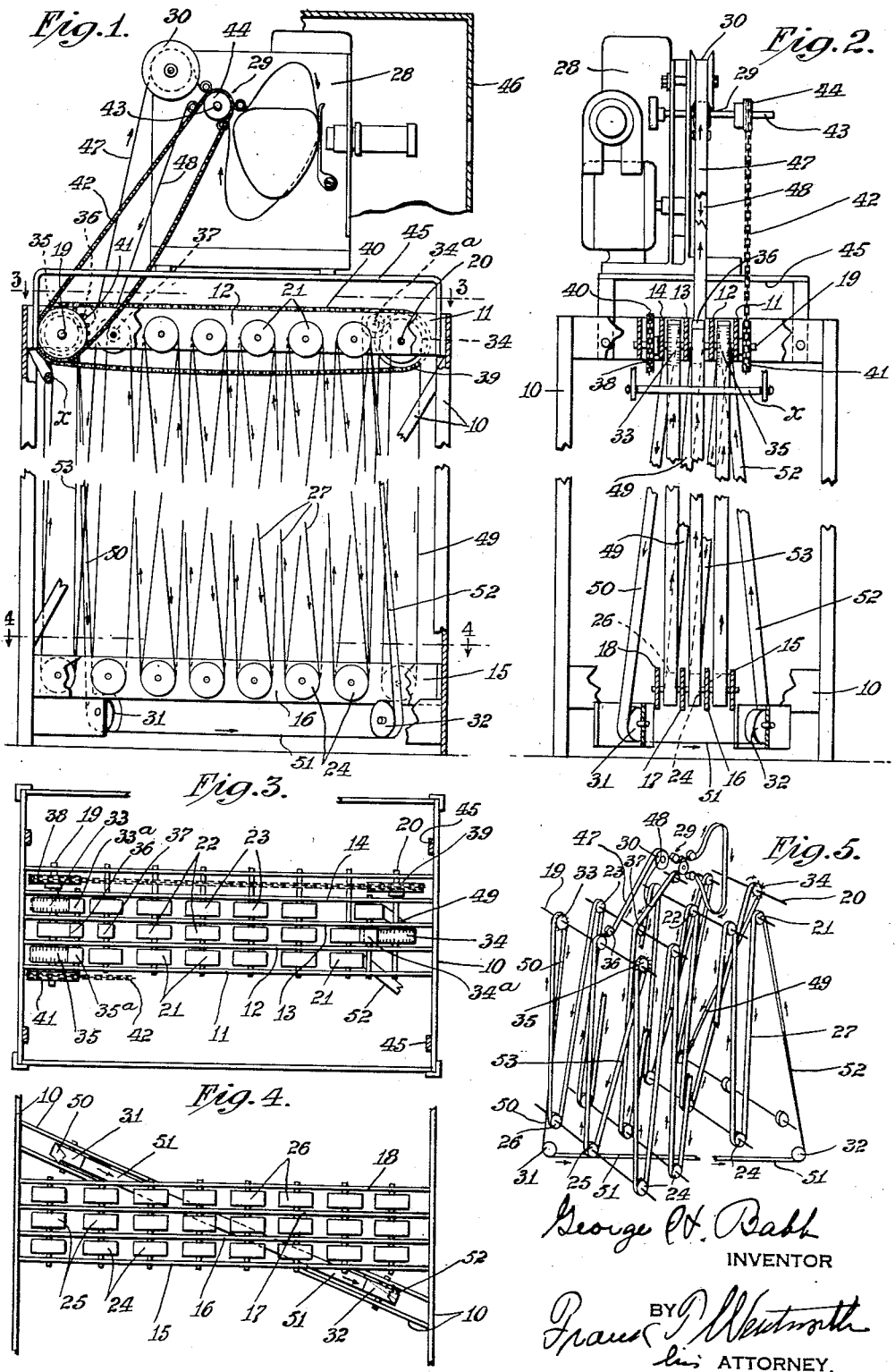
George H. Babb
INVENTOR
BY Francis J. Wentworth
his ATTORNEY.

Patented Dec. 7, 1937

2,101,126

UNITED STATES PATENT OFFICE 2,101,126

ADVERTISING CINEMATOGRAPH

George H. Babb, Brooklyn, N. Y.

Application November 17, 1936, Serial No. 111,209

9 Claims. (Cl. 88—18.7)

The invention relates to an advertising cinematograph, and more particularly to a moving picture projecting machine embodying therein a magazine for the film permitting the continuous operation of the machine with an endless film, so as to allow the repeated projection of a succession of pictures upon a screen without requiring the attention of an operator.

In a machine embodying the invention, it is essential that provision be made for guiding the run of a film of the desired length through the magazine in a manner to ensure a uniform movement of every part of the endless film at all times while the machine is in operation. This involves the inclusion in the magazine structure of a driving mechanism operative upon widely divergent portions of the film, and actuated at the same speed as the film feeding mechanism of the projector, and an arrangement of guides and driving sprockets in the magazine which will not only accommodate a film of the desired length, but will permit the control of the direction of the run of the film without subjecting it to stresses tending to break it.

The various guide rollers for directing the run of the film through the magazine are so arranged in relation to each other as to provide long runs of the film while in each of a plurality of banks, and to permit the automatic shifting of the film from bank to bank during the operation of the machine, in a manner to secure the continuous run of the film in successive banks and the ultimate bringing of each portion of the film to a position where it will have the proper relation to the film feeding mechanism of the cinematographic machine or projector.

The construction of the magazine must be such as to permit free access to the various guide rollers and driving mechanisms to facilitate the threading of the film through the magazine, and the splicing of the film if occasion should arise.

In order to ensure as nearly perfect synchronism in the operation of the feeding mechanism of the projector and the feeding mechanism of the magazine as possible, I preferably drive said mechanism from the source of power operating the projector by entraining all of the sprocket wheels of the magazine with each other and with the driving mechanism of the projector.

In a machine embodying the invention, the purpose is to provide a continuously operating machine by means of which a succession of pictures may be projected with a repeated projection of the same pictures with appropriate advertising matter, from time to time. The speed of operation of a projector precludes the use in a machine of this type of a reel of film, since such would require the presence of an attendant at all times and make its cost of operation for advertising purposes, prohibitive.

To secure the desired operation of the machine, a film magazine must be provided permitting the use of a film of the necessary length, and a continuous run of this film in a manner to secure the desired repetition of pictures delineated thereon and yet have the various parts of the magazine so arranged as to be contained within small compass.

During the run of the film, it must pass to and from the magazine and through the feeding mechanism of the projector, and through the magazine about guides so arranged as to provide a large number of long reaches of the film and permit the film in its run to pass from row to row of such guides and then be transferred from one row to another row. During this run of the film, its lineal speed must be the same as the speed imparted to the film by the film feeding mechanism of the projector, and the strain upon the film must be so distributed as to relieve the film from excessive stresses, particularly such as would result from over tautness in the film at some points, and slack in the film at other points.

While the machine employs an endless film so that, strictly speaking, there is no starting point in the run of the film, it is obvious that each portion of the film must be brought to its original starting point in the magazine, and must be guided to the film feeding mechanism of the projector in a proper relation to ensure a continued operation of the machine.

The use of guide rollers and driving mechanisms forming a plurality of banks of controlled straight runs of a film permits the use of films of different lengths by merely varying the threading arrangement of the film through the machine. It also permits the creation and maintenance of slack in the film throughout the magazine so as to avoid the development of tautness of the film which would interfere not only with the free run of the film through the magazine, but with the operation of the projector itself. Excessive tautness may also result in the breakage of the film.

The invention consists primarily in an advertising cinematograph consisting in the combination with a projector having a film feeding mechanism, of a magazine embodying therein a plurality of closely adjacent upper rows of guides, film feeding means including sprocket wheels at the opposite ends of adjacent rows of guides, a plurality of closely adjacent lower rows of guides spaced vertically from said upper rows of guides, means upon the opposite sides of the guides of each row spacing the guides of one row from those of another row and controlling the run of the film about the guides of each row, and crossover rollers parallel with each other and having axes oblique to the axes of said guides, whereby an endless film, after passing about guides in said rows, is transferred from a guide on one side of the magazine to a guide at the opposite side thereof, means entraining the film feeding mechanism of said projector and the film feeding means of said magazine, and a guide roller upon said projector adjacent said film feeding mechanism; and in such other novel features of construction and combination of parts, as are hereinafter set forth and described, and more particularly pointed out in the claims hereto appended.

Referring to the drawing,

Fig. 1 is a vertically condensed view of an advertising cinematograph embodying the invention;

Fig. 2 is an end view thereof from the left of Fig. 1 with a part of the frame broken away;

Fig. 3 is a section on the line 3—3 of Fig. 1;

Fig. 4 is a section on the line 4—4 of Fig. 1; and

Fig. 5 is a perspective view showing the run of the film.

Like numerals refer to like parts throughout the several views.

In the embodiment of the invention shown in the drawing, I provide an open framework 10 having adjacent the top thereof, a plurality of cross bars 11, 12, 13 and 14, and adjacent the bottom thereof, a second series of cross bars corresponding in number and location with the upper cross bars, these bottom bars being indicated at 15, 16, 17 and 18. At opposite ends of the upper cross bars are shafts 19 and 20 rotatably mounted in said bars.

Mounted between the bars 11 and 12 is a row of upper guides 21, a row of similar guides 22 being mounted between the bars 12 and 13, and a third row of similar guides 23 being mounted between the bars 13 and 14. Three rows of similar lower guides 24, 25 and 26 are mounted respectively between the bars 15 and 16, 16 and 17, and 17 and 18. The upper rows of guides 21, 22 and 23 are spaced vertically from the lower rows of lower guides 24, 25 and 26 a distance to secure a fairly long run of the film between the guides in the upper and lower rows. All of these guides have axes parallel with each other.

The number of roller guides in each row, and the number of rows of these guides may be varied to accommodate the magazine to different lengths of film, or to adapt it to the space available for its installation. By using a greater number of rollers in each row, the length of the machine will be increased and the length of the film usable therein will be increased, but not greatly. By increasing the number of rows, the width of the machine will be only slightly increased, but the length of film which may be used will be increased with arithmetical progression.

As will appear hereinafter, each bank of reaches of film is positively actuated, and to relieve the strain upon the machine, it is desirable to increase the number of positively driven banks of film rather than the length of film in each bank, since I have found that this reduces the strain upon the film.

An endless film 27 is used in the machine, and in its course through the machine, this film passes alternately about the upper and lower guides of one row, and then is given a lateral trend so as to pass about the upper and lower guides in the adjacent row, again having a lateral trend to the adjacent row. The spacing of the upper and lower rows from each other permits this lateral trend without developing tearing stresses upon the film.

At one point in the run of the film, it is brought into alinement with the film feeding mechanism of a projector shown at 28 which, in the form of the invention shown, is provided with a motor driven film feeding mechanism 29 adjacent which is an idler guide roller 30 having an axis parallel with the axis of the guide rollers, and in alinement with one of the rows of guides, 22 as shown in the drawing.

By reason of the fact that the film passes successively along the different rows of guides, it is essential that means be provided whereby after each part of the film has concluded its run through the last row of these guides, it will be guided or directed across the machine and delivered to the row of guides at the opposite side of the magazine. To secure this effect, I provide two cross-over rollers 31 and 32, these two rollers being mounted to have movement about parallel axes, which, however, extend obliquely to the axes of the various guide rollers. The cross-over roller 31 is positioned adjacent and below one end of the bottom cross bar 18, and the other roller 32 is positioned adjacent and below the bottom cross bar 15 toward the opposite end of these bars.

Both cross-over rollers are idler rollers, and their sole function is to ensure the run of the endless film 27 from end to end and from side to side of the machine below the bottom of the guide rollers. The degree of obliquity of the axes of these cross-over rollers is not material and will vary according to the length of the bars and the number of rows of guides. Because of the length of the run of the film between the upper and lower guides, but little distortion of the film occurs, even if the cross-over rollers have an obliquity of 45° or more.

It is essential to provide the magazine proper with film feeding means to avoid the development of unnecessary stresses upon the film and ensure a proper functioning of the film feeding mechanism 29 of the projector itself. This film feeding means comprises three sprocket wheels 33, 34 and 35. Two of these wheels are carried by the shaft 19 and are contained in the upper rows 21 and 23 of guide rollers, while the third sprocket 34 is carried by the shaft 20 and in the row of guides 22.

Adjacent the sprocket 33 is a small roller 33a for holding the film in relation to said sprocket. A similar roller 34a is mounted adjacent the sprocket 34, while another such guide roller 35a is mounted adjacent the sprocket 35.

Mounted adjacent one end guide roller of the row 22 is a reversing guide roller 36, the function of which is to change the direction of the run of the film so as to direct it toward the guide roller 30 upon the projector, this row also having a small guide roller 37 adjacent the guide roller 36 with which the return run of the film contacts in passing to a guide roller in the row 25.

The shafts 19 and 20 carry sprocket wheels 38 and 39 about which a driving chain 40 passes. The shaft 19 carries a sprocket wheel 41, thus entraining both sprocket wheels 38 and 39 with each other and by means of the chain 42 with the power shaft 43 of the film feeding mechanism of the projector, which shaft carries a sprocket wheel 44.

The projector 28 is supported from the top of the frame 10 by means of a superstructure 45, and the projector and its magazine are removably mounted in a non-inflammable casing as 46, a fragmentary portion of which is shown in Fig. 1. The projector is mounted upon the frame 10 of the magazine to ensure a fixed relation between guide rollers of the magazine and the guide roller 30 and feeding mechanism 29 of the projector with which these guide rollers co-operate.

At the end and below the upper row of guides adjacent the shaft 19 is a rotatable takeup sleeve $x$ acting upon all of the end reaches of the film.

The detailed construction of the projector itself has not been entered into, since this is immaterial to the invention. In actual practice, a standard type of projector has been used, modified by the removal of the feed and rewind reel supports and the substitution of the guide roller 30 and the addition of the sprocket wheel 44 and parts appurtenant thereto.

To successfully operate a machine embodying the invention, I provide a magazine, the construction and arrangement of parts in which is such as to permit the threading of a film in a manner to ensure a continuous run thereof during a prolonged operation of the projector.

The manner of threading the film through the magazine to ensure a desired run thereof, and the operation of the machine is substantially as follows:

In threading the film through the machine, the run of the film from the magazine over the guide roller 30 to the film feeding mechanism is indicated at 47 and the return run from the gate to the magazine is shown at 48. This return run passes about the guide roller 37 in the row 22, downwardly to one of the guide rollers in the lower row 25, this guide roller being the second one from the left as shown in Fig. 4 of the drawing.

After passing about this last named guide roller, the film passes to the right, upwardly and downwardly about the succeeding guide rollers in the rows 22 and 25, ultimately passing upwardly about the sprocket wheel 34 and between this wheel and the small guide roller 34a. This sprocket wheel has a clockwise movement and is positively driven in synchronism with the operation of the feed mechanism of the projector.

After leaving the sprocket wheel 34, the film is given a lateral trend, as indicated at 49, so as to cause it to pass about the last roller of the row 26 at the right of Fig. 4. The film is then passed upwardly and downwardly about the various guides of the rows 23 and 26 until it reaches the sprocket wheel 33 at the left of Fig. 3, in passing about which it is guided by the small guide roller 33a.

After passing about the said sprocket wheel 33, the film is given a lateral deflection, as indicated at 50, in its run from the sprocket wheel 33 to the cross-over roller 31. After passing about the cross-over roller 31, a reach 51 of the film passes obliquely across and below the various rows of lower guide rollers to the cross-over roller 32 about which it passes.

After passing about the cross-over roller 32, the film passes with an oblique trend along the reach 52 to one of the rollers of the row 21, after which it passes upwardly and downwardly about the upper guides of the row 21 and of the bottom guides of the row 24, alternately until it reaches the sprocket wheel 35 which is carried by the same shaft as, and rotates with, the sprocket wheel 33. In passing to the sprocket wheel 35, the film passes about the small guide roller 35a.

After passing about the sprocket wheel 35, the film passes downwardly with an oblique trend in a reach 53 to the guide roller at the extreme left of Fig. 4 in the row 25, passing upwardly from this guide roller to and about the guide roller at the extreme left of the upper row 22, after passing about which roller it passes under the small guide roller 36 into the feeding reach 47. After the film has thus been threaded through the machine, its ends are spliced in the usual manner so as to form an endless film, each portion of which repeatedly follows the course above described.

With long reaches of film between the upper and lower rows of guide rollers and between the upper guide rollers and the cross-over rollers, the lateral movement of the film is so gradual as to have no tendency to tear or otherwise mutilate the film.

Since all of the sprocket wheels 33, 34 and 35 are driven at the same peripheral speed as the sprocket wheel forming part of the feeding mechanism 29 of the projector, this mechanism merely takes up slack formed by the feeding mechanism of the magazine, which otherwise would develop in the reach 47, and pays out slack in the reach 48 which is taken up by the magazine feeding mechanism.

When power is applied to the projector, the feeding mechanism thereof and the feeding means of the magazine will immediately operate to impart the desired lineal traverse to the film, so that the film will simultaneously be fed in relation to the gate of the projector, and through the magazine, and at the same lineal speed. Any substantial tautness of the film in its run through the magazine will result in the stoppage of the projector, so that in threading the film through the magazine, care must be taken to provide sufficient slack to avoid the development of tautness, and to distribute this slack throughout the various banks of film between the rows of guides 21, 22 and 23 of the upper rows, and 24, 25 and 26 of the lower rows.

The machine shown in the drawing with three banks of film will accommodate approximately one hundred and twenty-five feet of film. The film used in the accompanying drawing is 16 mm. width, although the type of film used is immaterial to the invention and may be varied.

By the use of a positively driven sprocket wheel in each of the rows of guide rollers, and by the use of upper and lower guide rollers in the manner described, a proper feeding of the film through the magazine is assured and a proper distribution of slack throughout the various reaches of the film while in a magazine is preserved.

While, as stated, the machine of the drawing is designed to use one hundred and twenty-five feet of film, a shorter length of film may be used by skipping some of the guide rollers.

If it be desired to use a greater length of film, the capacity of the magazine may be increased by using additional rows of upper and lower guides, or by using a greater number of rollers in each row of guides. The former practice is preferable, since it permits the use of a greater number of feeding sprockets in the magazine and thus avoids likelihood of tightening of some of the vertical reaches.

With the exception of the sprocket wheels in the magazine, all of the guide rollers are idly mounted, and, with the exception of the small diameter guide rollers referred to, are of fairly large diameter to avoid abrupt bends in the film while passing about same. Smooth rollers are used in lieu of sprocket wheels since this not only facilitates the threading of the film through the magazine, but permits slippage of the film in relation to these guides so that the length of film contained in each bank represented by each pair of rows of co-operating guides will automatically adjust themselves so as to distribute slack throughout each bank.

It is not my intention to limit the invention to the precise details of construction shown in the accompanying drawing, it being apparent that such may be varied without departing from the spirit and scope of the invention.

Having described the invention, what I claim as new and desire to have protected by Letters Patent, is:—

1. An advertising cinematograph consisting in the combination with a projector having a film feeding mechanism, of a magazine embodying therein a plurality of closely adjacent upper rows of guides, film feeding means including sprocket wheels at the opposite ends of adjacent rows of guides, a plurality of closely adjacent lower rows of guides spaced vertically from said upper rows of guides, means upon the opposite sides of the guides of each row spacing the guides of one row from those of another row and controlling the run of the film about the guides of each row, and cross-over rollers parallel with each other and having axes oblique to the axes of said guides, whereby an endless film, after passing about guides in said rows, is transferred from a guide on one side of the magazine to a guide at the opposite side thereof, means entraining the film feeding mechanism of said projector and the film feeding means of said magazine, and a guide roller upon said projector adjacent said film feeding mechanism.

2. An advertising cinematograph consisting in the combination with a projector having a film feeding mechanism, of a magazine embodying therein a plurality of closely adjacent upper rows of guides, rotatable shafts at opposite ends of said rows of guides, sprocket wheels carried by said shafts respectively and at the ends of alternate rows of guides, a chain and sprocket mechanism connecting said shafts, a plurality of closely adjacent lower rows of guides spaced vertically from said upper rows of guides, and crossover rollers parallel with each other and having axes oblique to the axes of said guides, whereby an endless film, after passing about guides in said rows, is transferred from a guide on one side of the magazine to a guide at the opposite side thereof, means entraining the film feeding mechanism of said projector and one of said sprocket carrying shafts, and a guide roller upon said projector adjacent said film feeding mechanism.

3. An advertising cinematograph consisting in the combination with a projector having a film feeding mechanism, of a magazine embodying therein a plurality of closely adjacent upper rows of guides, rotatable shafts at opposite ends of said rows of guides, sprocket wheels carried by said shafts respectively and at the ends of alternate rows of guides, a chain and sprocket mechanism connecting said shafts, a holding guide roller co-operating with each sprocket wheel, a plurality of closely adjacent lower rows of guides spaced vertically from said upper rows of guides, and cross-over rollers parallel with each other and having axes oblique to the axes of said guides, whereby an endless film, after passing about guides in said rows, is transferred from a guide on one side of the magazine to a guide at the opposite side thereof, means entraining the film feeding mechanism of said projector and one of said sprocket carrying shafts, and a guide roller upon said projector adjacent said film feeding mechanism.

4. An advertising cinematograph consisting in the combination with a projector having a film feeding mechanism, of a magazine embodying therein a plurality of closely adjacent upper rows of guides, film feeding means including sprocket wheels at the opposite ends of adjacent rows of guides, a reversing guide roller adjacent a guide in one of said rows and directing the film toward the film feeding mechanism of said projector, a plurality of closely adjacent lower rows of guides spaced vertically from said upper rows of guides, means upon the opposite sides of the guides of each row spacing the guides of one row from those of another row and controlling the run of the film about the guides of each row, and crossover rollers parallel with each other and having axes oblique to the axes of said guides, whereby an endless film, after passing about guides in said rows, is transferred from a guide on one side of the magazine to a guide at the opposite side thereof, means entraining the film feeding mechanism of said projector and the film feeding means of said magazine, and a guide roller upon said projector adjacent said film feeding mechanism.

5. An advertising cinematograph consisting in the combination with a projector having a film feeding mechanism, of a magazine embodying therein a plurality of closely adjacent upper rows of guides, rotatable shafts at opposite ends of said rows of guides, sprocket wheels carried by said shafts respectively and at the ends of alternate rows of guides, a chain and sprocket mechanism connecting said shafts, a reversing guide roller adjacent a guide in one of said rows and directing the film toward the film feeding mechanism of said projector, a plurality of closely adjacent lower rows of guides spaced vertically from said upper rows of guides, and cross-over rollers parallel with each other and having axes oblique to the axes of said guides, whereby an endless film, after passing about guides in said rows, is transferred from a guide on one side of the magazine to a guide at the opposite side thereof, means entraining the film feeding mechanism of said projector and one of said sprocket carrying shafts, and a guide roller upon said projector adjacent said film feeding mechanism.

6. An advertising cinematograph consisting in the combination with a projector having a film feeding mechanism, of a magazine embodying therein a plurality of cross bars, a plurality of closely adjacent upper rows of guides idly mounted between and spaced from each other by said bars, film feeding means including sprocket wheels at the opposite ends of adjacent rows of guides, a plurality of closely adjacent lower rows of guides spaced vertically from said upper rows of guides, and cross-over rollers parallel with each other and having axes oblique to the axes of said guides, whereby an endless film, after passing about guides in said rows, is transferred from a guide on one side of the magazine to a guide at the opposite side thereof, means entraining the film feeding mechanism of said projector and the film feeding means of said magazine, and a guide roller upon said projector adjacent said film feeding mechanism.

7. An advertising cinematograph consisting in the combination with a projector having a film feeding mechanism, of a magazine embodying therein a plurality of cross bars, a plurality of closely adjacent upper rows of guides idly mounted between and spaced from each other by said bars, film feeding means including sprocket wheels at the opposite ends of adjacent rows of guides, a plurality of cross bars in substantial alinement with said other cross bars, a plurality of closely adjacent lower rows of guides idly mounted between and spaced from each other by said bars and spaced vertically from said upper rows of guides, and cross-over rollers parallel with each other and having axes oblique to the axes of said guides, whereby an endless film, after passing about guides in said rows, is transferred from a guide on one side of the magazine to a guide at the opposite side thereof, means entraining the film feeding mechanism of said projector and the film feeding means of said magazine, and a guide roller upon said projector adjacent said film feeding mechanism.

8. An advertising cinematograph consisting in the combination with a projector having a film feeding mechanism, of a magazine embodying therein a plurality of cross bars, a plurality of closely adjacent upper rows of guides positioned between and spaced from each other by said bars, rotatable shafts at opposite ends of said rows of guides, sprocket wheels carried by said shafts respectively and at the ends of alternate rows of guides, a chain and sprocket mechanism connecting said shafts, a plurality of cross bars in substantial alinement with said other cross bars, a plurality of closely adjacent lower rows of guides positioned between and spaced from each other by said bars and spaced vertically from said upper rows of guides, and cross-over rollers parallel with each other and having axes oblique to the axes of said guides, whereby an endless film, after passing about guides in said rows, is transferred from a guide on one side of the amgazine to a guide at the opposite side thereof, means entraining the film feeding mechanism of said projector and one of said sprocket carrying shafts, and a guide roller upon said projector adjacent said film feeding mechanism.

9. An advertising cinematograph consisting in the combination with a projector having a film feeding mechanism, of a magazine embodying therein a plurality of cross bars, a plurality of closely adjacent upper rows of guides positioned between and spaced from each other by said bars, rotatable shafts at opposite ends of said rows of guides, sprocket wheels carried by said shafts respectively and at the ends of alternate rows of guides, a chain and sprocket mechanism connecting said shafts, a holding guide roller cooperating with each sprocket wheel, a plurality of cross bars in substantial alinement with said other cross bars, a plurality of closely adjacent lower rows of guides positioned between and spaced from each other by said bars and spaced vertically from said upper rows of guides, and cross-over rollers parallel with each other and having axes oblique to the axes of said guides, whereby an endless film, after passing about guides in said rows, is transferred from a guide on one side of the magazine to a guide at the opposite side thereof, means entraining the film feeding mechanism of said projector and one of said sprocket carrying shafts, and a guide roller upon said projector adjacent said film feeding mechanism.

GEORGE H. BABB.